United States Patent [19]

Rhodes et al.

[11] E Patent Number: Re. 33,019

[45] Reissued Date of Patent: Aug. 15, 1989

[54] ENVIRONMENTALLY CONTROLLED BUILDING

[76] Inventors: James A. Rhodes; Michael Wren; Paul W. Lantz; George W. Acock, Jr., all c/o James A. Rhodes & Asso., Ste. 1300, 42 E. Gay St., Columbus, Ohio 43215

[21] Appl. No.: 105,365

[22] Filed: Oct. 7, 1987

Related U.S. Patent Documents

Reissue of:

[64] Patent No.: 4,608,785
Issued: Sep. 2, 1986
Appl. No.: 700,254
Filed: Feb. 11, 1985

[51] Int. Cl.[4] ..... E04B 1/345

[52] U.S. Cl. ..... 52/2; 52/63; 52/83; 52/236.3

[58] Field of Search ..... 52/2.2, 63, 83, 236.3

[56] References Cited

U.S. PATENT DOCUMENTS

| | | | |
|---|---|---|---|
| 1,402,077 | 1/1922 | Lanchester | 52/83 |
| 1,512,975 | 10/1924 | Bright | 52/236.1 |
| 1,991,695 | 2/1935 | Petrovich | 98/29 |
| 2,156,859 | 5/1939 | Lowe | 52/236.1 |
| 2,910,994 | 11/1959 | Joy | 52/2 |
| 3,159,165 | 12/1964 | Cohen et al. | 52/2 |
| 3,412,509 | 11/1968 | Popil | 52/2 |

*Primary Examiner*—James L. Ridgill, Jr.

*Attorney, Agent, or Firm*—Antonelli, Terry & Wands

[57] ABSTRACT

An environmentally controlled building having a covered atrium. The atrium roof can be a conventional rigid roof or an air-supported, flexible, continuous membrane roof. A pressurization system pressurizes the building interior and the atrium relative to the ambient atmospheric pressure outside the building. When the atrium has a membrane roof, this pressure differential inflates the membrane roof to maintain the roof in the desired configuration. Such a membrane roof can be semi-opaque to permit passage of diffused sunlight, permitting some plants to grow, while inhibiting passage of direct sunlight. Air locks are provided at the building entrances and exits to maintain the pressure differential as people enter and leave the building. A barometric pressure sensor monitors the ambient atmospheric pressure outside the building, and a control unit controls the pressurizing system to adjust the air pressure within the building and the atrium in response to variations in the ambient atmospheric pressure outside the building in an inverse relationship. As a consequence, ambient atmospheric pressure changes are not so noticeable to people within the building and the atrium. This is particularly beneficial to people having arthritis, rheumatism, or other physical conditions. The building heating, air conditioning and ventilating system includes air purification means for removing pollen and other pollutants from the air. The building thus provides a healthful environment for working, living, and leisure activities.

15 Claims, 2 Drawing Sheets

FIG. 2
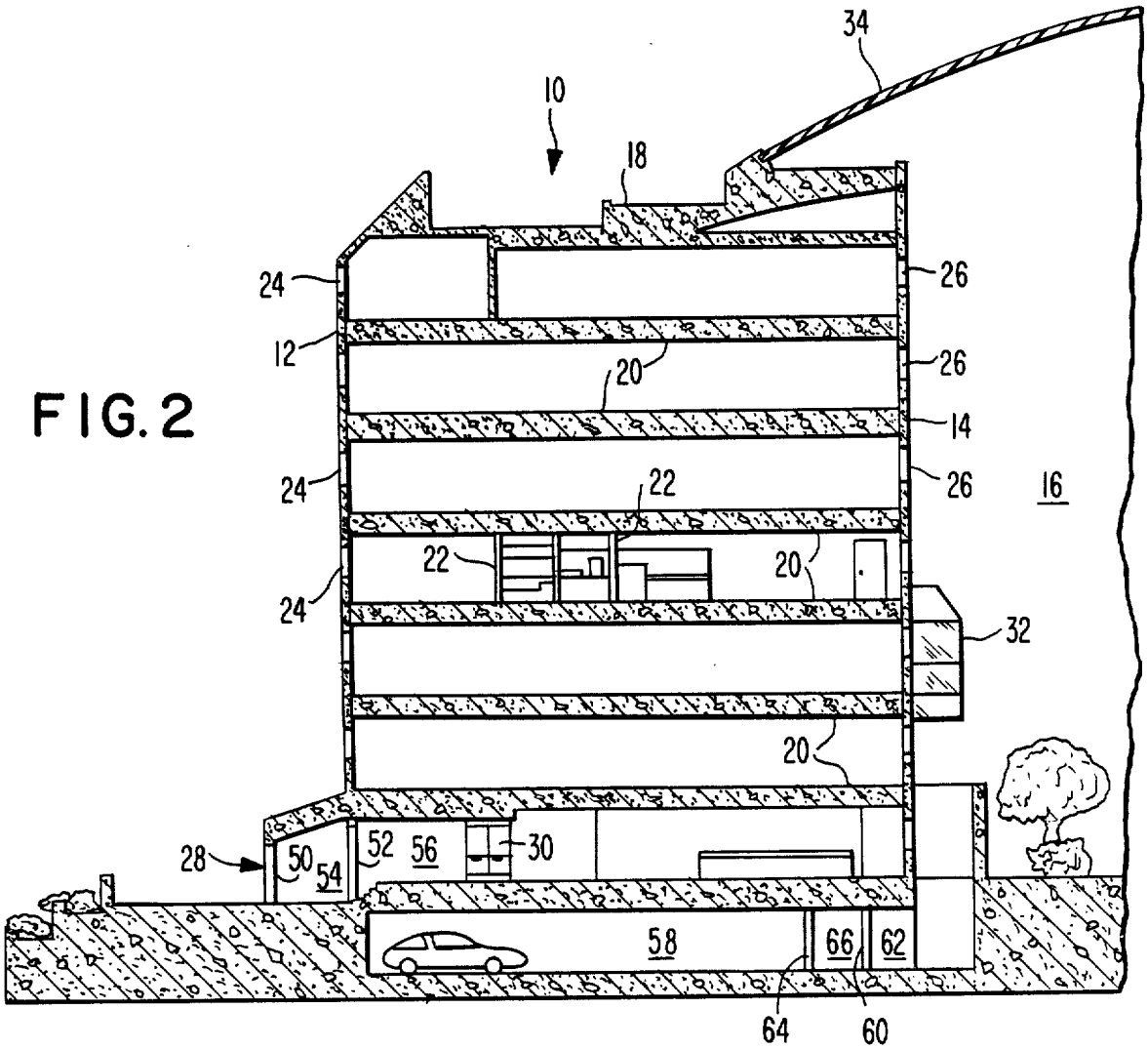
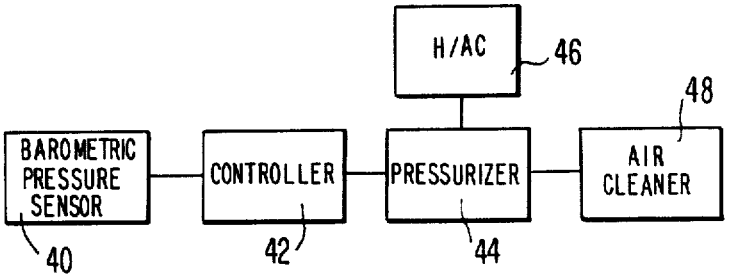
FIG. 3

ENVIRONMENTALLY CONTROLLED BUILDING

Matter enclosed in heavy brackets [ ] appears in the original patent but forms no part of this reissue specification; matter printed in italics indicates the additions made by reissue.

BACKGROUND OF THE INVENTION

The present invention pertains to an environmentally controlled building. More particularly, the present invention pertains to a building providing a healthful environment beneficial for people living, working, or spending leisure time in the building, while avoiding temperature extremes, polluted air, sudden variations in barometric pressure, and other conditions which are detrimental to the health and well being of the inhabitants. The building encloses a covered atrium or courtyard which can have an air supported continuous membrane fabric roof or a conventional roof.

Many people desire or require healthful, controlled environments in which to live, work, and engage in leisure activities. This is particularly true of older persons and of people having health problems such as respiratory problems, arthritis, or rheumatism. It is a common practice to control the temperature and humidity of the air within a building. More than simple temperature and humidity control are desirable, however. Thus, it is also desirable to remove pollen and other sources of pollution from the air. Additionally, sudden changes in ambient atmospheric pressure can have an adverse effect on people, particularly people bothered by arthritis or rheumatism, and so atmospheric pressure changes should be controlled.

SUMMARY OF THE INVENTION

The present invention is an environmentally controlled building, suitable for any of numerous uses including use as a residential apartment building, a commercial building, or a professional or a business office building. The environmentally controlled building has an outer circumferential wall which can be circular, square, rectangular or other desired shape, forming the outer building perimeter and defining the building exterior, the outer walls having fenestrations therethrough for passage of light and/or for entering and leaving the building. In the preferred embodiment, the building also has an inner circumferential wall within the center circumferential wall to define an atrium within the building, the inner building wall having fenestrations therethrough for viewing of and access to the atrium and for entering and leaving the building. A substantially rigid roof bridges the outer wall to the inner wall, and the resulting building interior is provided with several floors and walls to define the building as a multi-storey, multi-unit building. The atrium is covered by a roof which can be a rigid roof of conventional design or an air-supported, flexible, continuous membrane roof. Such a membrane roof is preferably semi-opaque to allow passage of diffused light, allowing plants to grow, while inhibiting passage of direct sunlight. A pressurization system pressurizes the building interior and the atrium relative to the ambient atmospheric pressure outside the building. When the atrium has a membrane roof, this pressure differential inflates the membrane roof to maintain the roof in the desired configuration over the atrium. Air locks are provided for the entrances and exits of the building to maintain the pressure differential as people enter and exit the building. A barometric pressure sensor monitors the ambient atmospheric pressure outside the building, and a control unit controls the pressurizing system to adjust the air pressure within the building and the atrium in response to variations in ambient atmospheric pressure outside the building in an inverse relationship. Thus, for example, should the ambient atmospheric pressure decrease significantly, say by 0.5 pounder per square inch, the control system causes the pressurizing system to increase the differential air pressure within the building by, say, $\frac{1}{8}$ to $\frac{1}{4}$ psi and then, over a period of time, to gradually reduce the pressure within the building to return to the original differential pressure. Conversely, if the ambient atmospheric pressure increases, the control system causes the pressure within the building to decrease slightly and then to gradually increase to return to the original differential pressure. As a consequence, ambient atmospheric pressure changes are not so noticeable to people within the building or the atrium, and so people having conditions which make sudden ambient atmospheric pressure changes bothersome are particularly helped.

The building is provided with a heating, air conditioning, and ventilation system which includes air purification means for removing pollen and other pollutants from the air within the building and the atrium.

BRIEF DESCRIPTION OF THE DRAWINGS

These and other aspects and advantages of the present invention are more apparent in the following detailed description and claims, particularly when considered in conjunction with the accompanying drawings in which like parts bear like reference numerals. In the drawings:

FIG. 2 is a sectional view of such a building, taken along line 2—2 of FIG. 1; and FIG. 3 is a block diagram of an air control system, including heating, air conditioning, pressurization, and filtration, suitable for use in an environmentally controlled building in accordance with the present invention.

FIG. 1 depicts an environmentally controlled building 10, which, by way of example, might be an apartment building, a commercial building, or a professional or office building and which, in FIG. 1, is depicted as circular. As seen in FIGS. 1 and 2, building 10 includes an outer circumferential wall 12 forming the outer building perimeter and defining the building exterior. Building 10 also has an inner circumferential wall 14 defining an atrium 16 within the building. A substantially rigid roof 18, of conventional design, bridges outer wall 12 to inner wall 14. A number of floors 20 are positioned at different vertical levels within the interior of building 10. As illustrated by the first floor and the fourth floor of building 10, each floor is provided with several walls 22 to define the building as a multi-story, multi-unit building. A number of fenestrations are provided in both outer circumferential wall 12 and inner circumferential wall 14. Thus, for example, window is provided in outer circumferential wall at each floor 20 of the building, and likewise a window 26 is provided in inner circumferential wall 14 for each floor 20. An entrance 28 is provided at the ground floor level of outer circumferential wall 12 to permit people to enter and leave building 10. Alternatively, entering and leaving of the building can be through a basement garage or other basement level entrance and exit.

FIG. 2 depicts an elevator 32 moving vertically on inner circumferential wall 14 and within atrium 16 to provide access to the several floors 20 of building 10.

Figure 1:
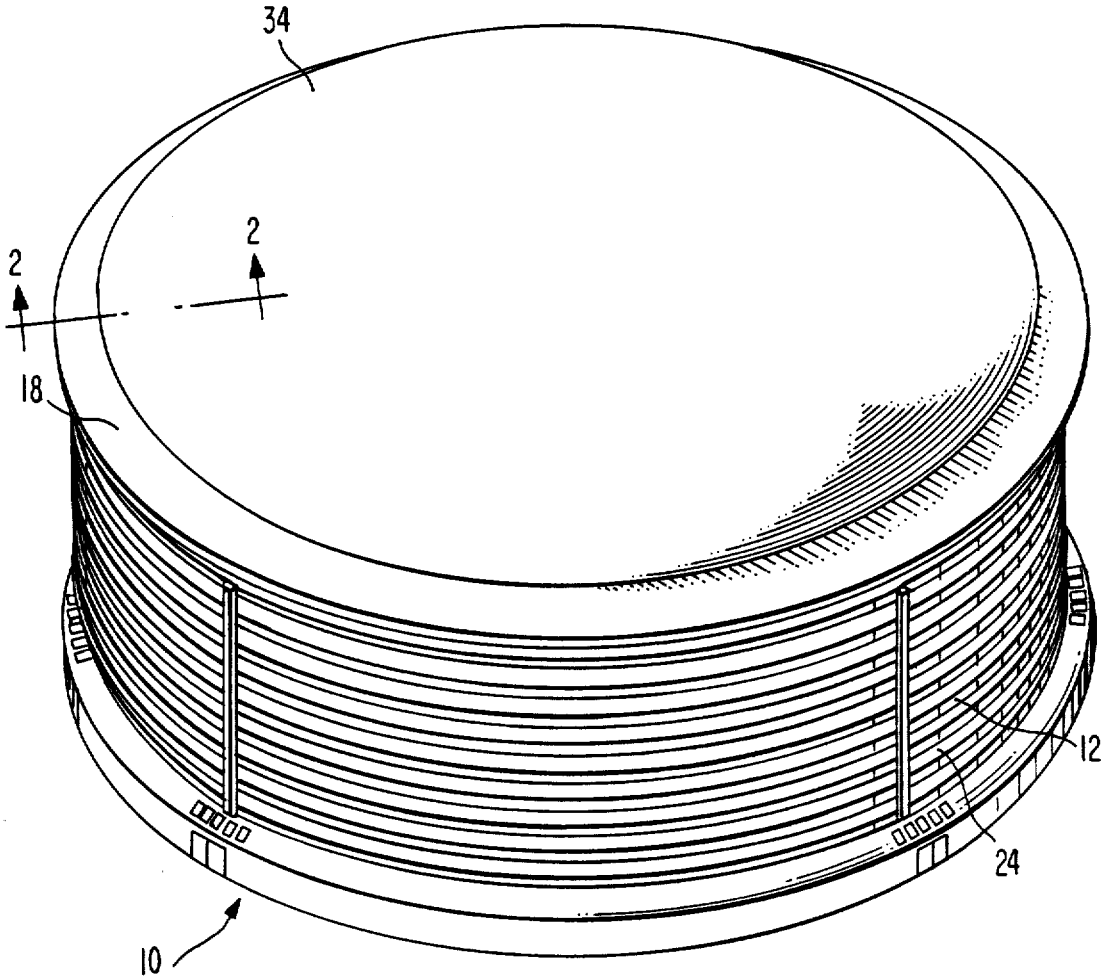
FIG. 1 is a perspective view of a preferred embodiment of an environmentally controlled building in accordance with the present invention.

Atrium 16 is covered by a roof 34. Roof 34 can be a substantially rigid roof of conventional design, if desired. Alternatively, roof 34 can be a flexible, continuous membrane roof, formed for example of Owens-Corning Structo-Fab fabric, a material formed of glass fiber yarn and fluorocarbon resin and available from Owens-Corning Fiberglas Corporation. Such a roof is preferably semi-opaque to allow passage of diffused sunlight, allowing various plants to grow, while inhibiting passage of direct sunlight.

Atrium 16, and thus roof 34, can be of any desired size. An atrium of three to four acres can be accommodated in a building having in the order of about 40 to 50 residential apartment units on each floor 20.

FIG. 3 depicts an air control system for building 10. A barometric pressure sensor 40 senses the ambient atmospheric pressure outside building 10 and provides an indication of that atmospheric pressure to controller 42. Pressurizer 44, which can be a conventional fan for the building heating and air conditioning system, is controlled by controller 42 to maintain the air pressure within building 10 and atrium 16 at the desired level. A heating and air conditioning unit 46 is also connected to fan 44 to control the temperature and humidity within the common areas of building 10 and within atrium 16. A filter or air cleaner 48 is preferably provided to remove pollen and other pollutants from the air supplied to building 10 and atrium 16. Controller 42 preferably maintains the air pressure within building 10 and atrium 16 slightly above ambient atmospheric pressure, while distributing the heating and/or cooling air from unit 46. If roof 34 is a flexible, continuous membrane roof, then this elevated air pressure maintains roof 34 in the desired inflated configuration. Roof 34 can be a dome shaped surface, a hyperbolic paraboloidal surface, or other desired surface. Because building 10 is not air tight, the air pressure differential between the building interior and atrium 16 and ambient atmospheric pressure results in a substantially continuous flow of air from the building to the outside of the building. This inhibits entry of pollen or other pollutants into the building.

When barometric pressure sensor 40 senses a change in the ambient atmospheric pressure, controller 42 controls the air pressure within building 10 and atrium 16 in such a manner that the air pressure difference between the interior of building 10 and atrium 16 and the ambient atmospheric pressure changes in the opposite direction by a small amount. Thus, for example, if the ambient atmospheric pressure, decreases by, say, 0.5 pounds per square inch, controller 42 causes the differential air pressure, between the interior of building 10 and atrium 16 and the ambient atmospheric pressure, to increase by, say, ⅛ to ¼ psi. Controller 42 then causes the pressure differential to reduce over a period of time until it is returned to the original pressure differential. This protects occupants of building 10 and atrium 16 from the effects of sudden changes in ambient atmospheric pressure. Many people, particularly elderly people and people having arthritis, rheumatism or other marginal health conditions, are sensitive to relatively sudden changes in ambient atmospheric pressure, and so the control system utilized in the building of the present invention helps to protect such people from ill effects.

Entrance 28 to building 10 includes a first set of doors 50 and a second set of doors 52, as well as a revolving door 30. The resulting chamber 54, between doors 50 and 52, and chamber 56, between doors 52 and 30, provide an air lock between the pressurized interior of building 10 and the outside. If desired, a single door 50, or 52 could be utilized with a single chamber 54 or 56. The interior of elevator 32 likewise serves as an air lock. If desired, the pressure within the interior of elevator 32 can be brought closer to atmospheric pressure as elevator 32 approaches basement level 58. When the elevator 32 is at the level of basement 58, a first door 60 defines a first chamber 62 between elevator 32 and door 60, and a second door 64 defines a second chamber 66 between doors 60 and 64, so that someone emerging from elevator 32 passes from the elevator into chamber 62, then through door 60 to the chamber 66, then, with door 60 closed, through door 64 to the interior of basement 58 which is at ambient atmospheric pressure. Again, if desired, a single door 60, with a single air lock transition chamber 62, might be utilized. Basement 58 can house a parking garage or other facilities.

Although the present invention has been described with reference to a preferred embodiment, modifications and rearrangements can be made, and still the result would be within the scope of the invention.

What is claimed is:

1. An environmentally controlled building suitable for use as a residential [apartment] building, a commercial building or a professional or business office building, or a combination thereof, said building comprising:

an outer circumferential wall forming an outer building perimeter and defining the building exterior;

an inner circumferential wall within said outer circumferential wall and defining an atrium within the building;

at least one of said outer circumferential wall and said inner circumferential wall having fenestrations therethrough;

a substantially rigid roof bridging said outer circumferential wall to said inner circumferential wall, [and a plurality of] *an* interior [floors] *floor,* and *a plurality of interior* walls, *all* cooperating with said outer circumferential wall and said inner circumferential wall to define a [multistorey, multiunit] building interior;

a second roof covering the atrium;

pressure sensing means for sensing the ambient atmospheric pressure outside the building;

pressurizing means for pressurizing the building interior and the atrium above the ambient atmospheric pressure outside the building;

first control means responsive to the ambient atmospheric pressure sensed by said pressure sensing means for controlling said pressurizing means to adjust the air pressure within the building interior and the atrium in response to variations in the ambient atmospheric pressure outside the building so that when there is a first difference between the ambient atmospheric pressure and the air pressure within the building and the atrium and the ambient atmospheric pressure changes in a given direction by a first amount, the air pressure within the building and the atrium initially changes in the given direction by a second amount less than the first amount, thereby changing the difference between the ambient atmospheric pressure and the pressure within the building and the atrium, following which the air pressure within the building and the atrium changes further in the given direction to return the difference between the ambient atmospheric pressure and the pressure within the building and the atrium to the first difference; and air lock means cooperating with at least some of the fenestrations for permitting personnel to enter and exit the building interior and atrium without substantial loss of pressure from the building interior and the atrium.

2. A building as claimed in claim 1 in which said second roof is substantially rigid.

3. A building as claimed in claim 1 in which said air lock means comprises a plurality of doors defining an air pressure transition chamber adjacent at least one of the fenestrations.

4. A building as claimed in claim 3 in which at least one of said doors is a revolving door.

5. A building as claimed in claim 3 in which said air lock means further comprises an elevator within one of the building interior and the atrium.

6. A building as claimed in claim 1 in which said second roof is a flexible, continuous membrane roof.

7. A building as claimed in claim 6 in which said membrane roof is semi-opaque, permitting passage of diffused light while inhibiting passage of direct sunlight.

8. A building as claimed in claim 6 in which said pressurizing means pressurizes said membrane roof to maintain said roof in a preselected configuration.

9. A building as claimed in claim 8 in which the pressurized roof is substantially dome shaped.

10. A building as claimed in claim 8 further comprising a heating, air-conditioning and ventilating system for controlling the temperature and humidity of air within the building interior and the atrium.

11. A building as claimed in claim 10 in which said system includes air filter means for filtering pollutants from the air within the building interior and the atrium.

*12. A building as claimed in claim 1 having a plurality of interior floors cooperating with said outer circumferential wall and said inner circumferential wall to define the building interior as a multi-storey building.*

*13. A building as claimed in claim 1 having a plurality of interior walls cooperating with said outer circumferential wall and said inner circumferential wall to define the building interior as a multi-unit building.*

*14. A building as claimed in claim 1 having a plurality of interior floors and a plurality of interior walls cooperating with said outer circumferential wall and said inner circumferential wall to define the building interior as a multi-storey building interior.*

*15. A building as claimed in claim 1 having a plurality of interior floors and a plurality of interior walls cooperating with said outer circumferential wall and said inner circumferential wall to define the building interior as a multi-storey, multi-unit building.*

* * * * *